(12) United States Patent
Kobayashi et al.

(10) Patent No.: US 8,835,077 B2
(45) Date of Patent: Sep. 16, 2014

(54) ELECTRODE MATERIAL AND SOLID OXIDE FUEL CELL CONTAINING THE ELECTRODE MATERIAL

(75) Inventors: Ayano Kobayashi, Nagoya (JP); Shinji Fujisaki, Kuwana (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 439 days.

(21) Appl. No.: 13/185,798

(22) Filed: Jul. 19, 2011

(65) Prior Publication Data

US 2012/0021334 A1    Jan. 26, 2012

(30) Foreign Application Priority Data

Jul. 21, 2010 (JP) ................................ 2010-164011
May 20, 2011 (JP) ................................ 2011-114049

(51) Int. Cl.
*H01M 4/86* (2006.01)
*H01M 4/88* (2006.01)
*H01M 4/90* (2006.01)
*H01M 8/12* (2006.01)

(52) U.S. Cl.
CPC ............ *H01M 4/9033* (2013.01); *Y02E 60/525* (2013.01); *H01M 2008/1293* (2013.01); *Y02E 60/50* (2013.01); *H01M 4/8835* (2013.01)
USPC ........................... 429/489; 429/486; 429/485

(58) Field of Classification Search
CPC  H01M 4/8835; H01M 4/9033; H01M 4/9025
USPC .................................. 429/488–489, 485, 486
See application file for complete search history.

(56) References Cited

U.S. PATENT DOCUMENTS 6,060,420 A     5/2000  Munakata et al.
2010/0216047 A1*  8/2010  Marlin et al. .................. 429/465

FOREIGN PATENT DOCUMENTS

| JP | 08-130018 | A1 | 5/1996 |
|---|---|---|---|
| JP | 2006-032132 | A1 | 2/2006 |
| JP | 2010-118155 | A1 | 5/2010 |
| WO | WO 2009-047421 | * | 4/2009 |

* cited by examiner

*Primary Examiner* — Milton I Cano
*Assistant Examiner* — Stephen Yanchuk
(74) *Attorney, Agent, or Firm* — Burr & Brown, PLLC

(57) ABSTRACT

The electrode material contains a complex oxide and at least one of $ZrO_2$ and a compound comprising $ZrO_2$. The complex oxide has a perovskite structure represented by a general formula $ABO_3$. $ZrO_2$ is contained in an amount of $0.3 \times 10^{-2}$ wt % to 1 wt % relative to the entire electrode material.

6 Claims, 4 Drawing Sheets

ELECTRODE MATERIAL AND SOLID OXIDE FUEL CELL CONTAINING THE ELECTRODE MATERIAL

CROSS-REFERENCE TO RELATED APPLICATIONS

This application claims priority to Japanese Patent Application No. 2010-164011 filed on Jul. 21, 2010 and Japanese Patent Application No. 2011-114049, filed on May 20, 2011. The entire disclosure of Japanese Patent Application No. 2010-164011 and Japanese Patent Application No. 2011-114049 is hereby incorporated herein by reference.

BACKGROUND OF THE INVENTION

1. Field of the Invention

The present invention relates to an electrode material and a solid oxide fuel cell containing the electrode material.

2. Description of the Related Art

In recent years, fuel cells have been attracting attention from the environmental viewpoint and from the viewpoint of effective use of energy resources, and several materials and structures have been proposed for fuel cells.

Patent Document (see Japanese Patent Application Laid-Open No. 2006-32132) discloses use of LSCF powder as base powder of the cathode of a solid oxide fuel cell (SOFC).

SUMMARY OF THE INVENTION

However, in a fuel cell, peeling may occur at the interface between the electrode and an other layer that is in contact with the electrode.

Such peeling, once it occurs, deteriorates the output characteristics.

An object of the present invention is to provide a novel electrode material that can stably function over a long period of time by inhibiting peeling at the interface between an electrode and an other layer, and to provide a solid oxide fuel cell containing the electrode material.

The inventors, as a result of having conducted diligent research to address the above-described problem, found that a suitable amount of zirconia ($ZrO_2$) contained in a cathode inhibits peeling at the interface between the cathode and an other layer that is in contact with the cathode.

That is, the electrode material according to the first aspect of the present invention is provided with a complex oxide and at least one of $ZrO_2$ and a compound comprising $ZrO_2$. The complex oxide has a perovskite structure represented by a general formula $ABO_3$. $ZrO_2$ is contained in an amount of $0.3 \times 10^{-2}$ wt % to 1 wt % relative to the entire electrode material.

The solid oxide fuel cell according to the second aspect of the present invention is provided with a cathode composed of the electrode material, an anode, and a solid electrolyte layer disposed between the cathode and the anode.

For example, when applied to the electrode of a fuel cell, the electrode material can inhibit generation of peeling at the interface between the electrode and another component that is disposed so as to be in contact with the electrode, thereby enabling the fuel cell to stably function over a long period of time.

The electrode material is suitable as, for example, a material for forming the electrode of a fuel cell. An electrode formed with the electrode material can inhibit peeling at the interface between the electrode and a layer that is disposed so as to be in contact with the electrode.

DETAILED DESCRIPTION OF THE INVENTION

1. Electrode Material

Figure 1:
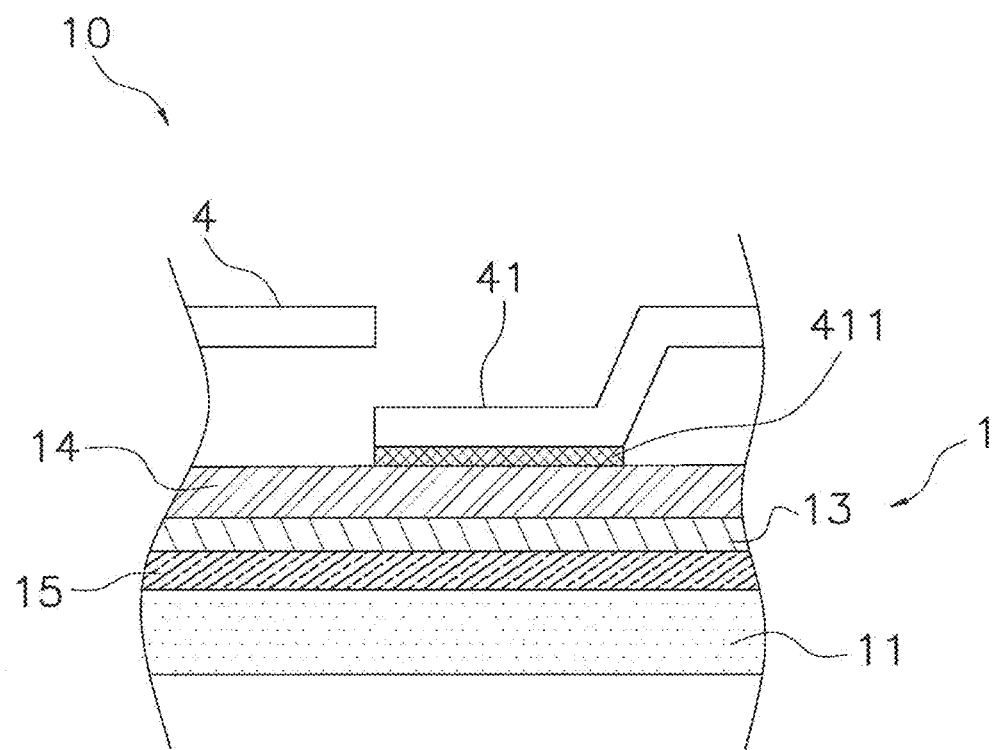
FIG. 1 is a cross sectional view showing the structure of the principal part of a fuel cell.

The electrode material contains a complex oxide having a perovskite structure and at least one of zirconia ($ZrO_2$) and a compound containing zirconia (for example, yttria-stabilized zirconia (YSZ) or the like).

The composition of the complex oxide is represented by a general formula $ABO_3$. The A site may include at least one of La and Sr.

Specific examples of such complex oxides include LSCF or $(LaSr)(CoFe)O_3$, LSF or $(LaSr)FeO_3$, LSC or $(LaSr)CoO_3$, LNF or $La(NiFe)O_3$, SSC or $(SmSr)CoO_3$, and like materials. These complex oxides are materials that have both oxygen ion conductivity and electron conductivity, and are called mixed conductive materials.

The electrode material may contain the complex oxide as a "principal component." The phrase "composition X contains material Y as a principal component" means that material Y accounts for preferably 60 wt % or greater, more preferably 70 wt % or greater, and still more preferably 90 wt % or greater relative to the entire composition X.

The electrode material may be a powder. The average particle diameter of the powder is preferably 20 μm or less, more preferably 5.0 μm or less, and still more preferably 1.0 μm or less. The average particle diameter may be measured by a laser diffraction/scattering particle size distribution analyzer (LA-700, manufactured by Horiba Ltd.).

Zirconia is contained in an amount of $0.3 \times 10^{-2}$ wt % to 1 wt % relative to the entire electrode material. The amount of zirconia can be measured by, for example, subjecting the electrode material to inductively coupled plasma atomic emission spectroscopy (ICP-AES).

The electrode material may contain a component other than the complex oxide and zirconia.

2. Method for Producing Electrode Material

An example of a method for producing the electrode material of section 1 above will now be described below.

Specifically, the production method includes obtaining a complex oxide having a perovskite structure, triturating the complex oxide, and adding zirconia to the complex oxide.

Examples of methods for obtaining a complex oxide having a perovskite structure include solid phase processes, liquid phase processes (such as citrate process, Pechini process, and co-precipitation process), and the like.

Trituration is performed with, for example, a ball mill. The complex oxide may be pulverized before trituration. That is, it is possible that a lump of a material having a perovskite structure is prepared, broken down (pulverized) so as to have a diameter of 200 μm or less, and triturated more finely. By pulverization and trituration, the average particle diameter of the material is controlled to 20 μm or less, 5 μm or less, or 1 μm or less.

It is preferable that the additive amount of zirconia is controlled to $0.3 \times 10^{-2}$ wt % or greater relative to the entire electrode material. The additive amount of zirconia may be controlled to no more than 1 wt % relative to the entire electrode material. Addition of zirconia may be performed such that zirconia powder is mixed with a triturated complex oxide having a perovskite structure, or zirconia strips are triturated together with a complex oxide that is not triturated. Moreover, by adding a zirconia-containing compound (such as yttria-stabilized zirconia (YSZ)) or by adding both a zirconia-containing compound and zirconia, the additive amount of zirconia may be controlled so as to be within the aforementioned range.

3. Fuel Cell (Solid Oxide Fuel Cell)

A solid oxide fuel cell (SOFC) will now be described as an example of a fuel cell. In particular, an SOFC stack having a cell stack structure in which a plurality of fuel cells are stacked will be mainly described below.

3-1. Outline of Fuel Cell Stack

As shown in FIG. 1, a fuel cell stack 10 is provided with a fuel cell 1 (hereinafter simply referred to as a "cell") and a current collector 4.

3-2. Outline of Cell 1

The cell 1 is a thin plate of ceramic. The thickness of the cell 1 is, for example, 30 μm to 700 μm, and the diameter of the cell 1 is, for example, 5 mm to 50 mm. As shown in FIG. 1, the cell 1 is provided with an anode 11, a barrier layer 13, a cathode 14, and an electrolyte layer (solid electrolyte layer) 15.

3-3. Anode

As the material of the anode 11, for example, a material that is for use in forming an anode in a known fuel cell is used. More specific examples of the material of the anode 11 include nickel oxid-yttria-stabilized zirconia (NiO—YSZ) and/or nickel oxide-yttria (NiO—$Y_2O_3$). The anode 11 can contain these materials as principal components.

The anode 11 may function as a substrate that supports other layers included in the cell 1 (the substrate may also be referred to as a support). That is, the anode 11 may have the largest thickness among the layers included in the cell 1. Specifically, the thickness of the anode 11 may be 10 μm to 600 μm.

Electric conductivity can be imparted to the anode 11 by subjecting the anode 11 to a reduction treatment (for example, a treatment to reduce NiO to Ni).

Moreover, the anode 11 may have two or more layers. For example, the anode 11 may have two layers, i.e., a substrate and an anode active layer (fuel side electrode) formed thereon. Materials of the substrate and the anode active layer can be selected from the materials of the anode 11 described above. More specifically, a substrate composed of NiO—$Y_2O_3$ and an anode active layer composed of NiO—YSZ may be combined.

3-4. Barrier Layer

The barrier layer 13 is provided between the cathode 14 and the anode 11, and more specifically the barrier layer 13 is provided between the cathode 14 and the electrolyte layer 15.

The barrier layer 13 contains cerium. The barrier layer may contain cerium in the form of ceria (cerium oxide). Specific examples of the material of the barrier layer 13 include ceria and ceria-based materials containing a rare earth metal oxide and forming a solid solution with ceria. The barrier layer 13 can contain a ceria-based material as a principal component.

Specific examples of the ceria-based material include gadolinium-doped ceria (GDC: $(Ce,Gd)O_2$), samarium-doped ceria (SDC: $(Ce,Sm)O_2$), and the like. The concentration of rare earth metal in the ceria-based material is preferably 5 to 20 mol %. The barrier layer 13 may contain an additive in addition to the ceria-based material.

The thickness of the barrier layer 13 may be 30 μm or less.

The barrier layer 13 can inhibit diffusion of cation from the cathode 14 into the electrolyte layer 15. That is, the barrier layer 13 can inhibit a decrease of output density and extend the life of the cell 1.

3-5. Cathode

The cathode 14 is composed of the electrode material described in section 1 above. The thickness of the cathode 14 may be about 5 μm to 50 μm.

In the case where the cathode 14 is in contact with another layer, the presence of zirconia in a surface region of the cathode 14 formed along the other layer in the thickness direction inhibits peeling at the interface between the cathode 14 and the other layer. This appears to be the effect brought about by the formation of a solid solution between zirconia in the cathode 14 and the component of the other layer.

While repetitive power generation may result in degradation (change in microstructure) of the cathode 14, the presence of zirconia in the inner region of the cathode 14 in the thickness direction can strengthen the skeleton inside the cathode 14. It is thus possible to inhibit a change in the microstructure of the cathode 14.

Meanwhile, zirconia and another component present in the cathode may react. The obtained reaction product may result in a phenomenon of impaired output density because of an increased electric resistance value of the cell, decreased reaction active spots, the non-uniform composition of the cathode, and the like. However, these phenomena are also inhibited when the amount of zirconia is 1 wt % or less.

The above-described effects of adding zirconia are the inventors' own findings.

In addition to attaining the effects described above, zirconia is used also to impart oxygen ion conductivity to an electron conductive material. For example, since (LaSr)$MnO_3$, or LSM, is an electron conductive material that does not have oxygen ion conductivity, LSM can be used, after being mixed with zirconia, in the form of a composite material in the case where LSM is used for a cathode.

When zirconia is used to attain oxygen ion conductivity, the ratio of LSM to zirconia mixed is, however, about 1:1. As described above, the amount of zirconia in the electrode material in this embodiment is much lower (no more than 1 wt %) than the amount of zirconia for attaining oxygen ion conductivity. That is, the inventors have found the specific effect brought about, not by the addition of a large amount of zirconia as used to impart oxygen ion conductivity, but by the addition of a small amount of zirconia.

While no specific discussion is presented in the above description, in the case where lanthanum (La) is contained in the electrode material, at least part of zirconium constituting zirconia added to the electrode material may be present in the form of lanthanum zirconate ($La_2Zr_2O_7$) in the cathode 14. Similarly, in the case where strontium (Sr) is contained in the electrode material, at least part of zirconium constituting zirconia added to the electrode material may be present in the form of strontium zirconate ($SrZrO_3$) in the cathode 14.

In the case where the cathode 14 is in contact with an other layer, the presence of lanthanum zirconate or strontium zirconate in a surface region of the cathode 14 formed along the other layer in the thickness direction inhibits peeling at the interface between the cathode 14 and the other layer.

Also, the presence of lanthanum zirconate or strontium zirconate in the inner region of the cathode 14 in the thickness direction can strengthen the skeleton inside the cathode 14. It is thus possible to inhibit a change in the microstructure of the cathode 14.

Whether zirconium is in the form of zirconia, lanthanum zirconate, or strontium zirconate can be determined by, for example, analyzing a diffraction pattern of a transmission electron microscope (TEM).

Although the barrier layer 13 is in contact with the cathode 14 in this embodiment, the solid electrolyte layer 15, for example, may be in contacted with the cathode 14.

3-6. Electrolyte Layer

The electrolyte layer 15 is provided between the barrier layer 13 and the anode 11.

The electrolyte layer 15 contains zirconium. The electrolyte layer 15 may contain zirconium in the form of zirconia ($ZrO_2$). Specifically, the electrolyte layer 15 can contain zirconia as a principal component. The electrolyte layer 15 can contain, in addition to zirconia, additives such as $Y_2O_3$ and/or $Sc_2O_3$. Such additives can function as stabilizers. The amount of additive in the electrolyte layer 15 is about 3 to 20 mol %. That is, examples of the material of the electrolyte layer 15 include zirconia-based materials such as yttria-stabilized zirconia, e.g., 3YSZ, 8YSZ, and 10YSZ; scandia-stabilized zirconia (ScSZ); and the like.

The thickness of the electrolyte layer 15 may be 30 μm or less.

3-7. Current Collector

The current collector 4 is provided with a plurality of conductive connectors 41.

As shown in FIG. 1, an conductive connector 41 is a depression provided in the current collector 4, and the bottom thereof is connected to the cathode 14 via a conductive adhesive 411. The bottom of the conductive connector 41 has a portion that is discontinuous with its surroundings.

During power generation, fuel gas is supplied to the anode 11. Air is supplied to the cathode 14 by blowing air toward the side-surface of the cell stack structure (for example, toward the surface of the paper showing FIG. 1).

Although not shown, the fuel cell stack 10 is further provided with a lead wire that sends the electric current generated in the cell stack 10 to an external apparatus, a gas reformer that includes, e.g., a catalyst to reform fuel gas, and a like member.

4. Method for Producing Fuel Cell 4-1. Formation of Anode

The anode 11 can be formed by compacting molding. That is, the formation of the anode 11 may include introducing mixed powder of the materials of the anode 11 into a mold and compacting the powder to give a green compact.

The materials of the anode 11 are as discussed in connection with the configuration of the fuel cell in the description provided above. For example, nickel oxide, zirconia, and optionally a pore-forming agent are used as the materials. The pore-forming agent is an additive to create holes in the anode. As the pore-forming agent, a material that disappears in a subsequent process is used. An example of such a material may be cellulose powder.

The ratio of the materials mixed is not particularly limited and is suitably set according to the properties required of the fuel cell.

Also, the pressure applied to the powder during compacting molding is set such that the anode has sufficient rigidity.

The internal structure of the anode 11, e.g., a gas passage (not shown), may be formed by performing compacting molding with a member that is eliminated when calcined (a cellulose sheet or the like being arranged inside the powder, and then performing calcination.

4-2. Formation of Electrolyte Layer

The method for producing a fuel cell includes forming an electrolyte layer on the green body of the anode formed by compacting molding.

Examples of methods for forming an electrolyte include cold isostatic pressing (CIP) method and thermocompression bonding both of which use an electrolyte material processed into a sheet form, and slurry dip method in which an anode is dipped into an electrolyte material that has been prepared so as to take a slurry form. In CIP method, the pressure applied during the compression bonding of the sheet is preferably 50 to 300 MPa.

4-3. Calcination

The method for producing a fuel cell includes co-calcining (co-sintering) the anode that has been compacting-molded and the electrolyte layer. Conditions such as calcination temperature and calcination time are set according to the materials of the cell and other factors. The calcination temperature can be set to, for example, about 1350° C. to 1500° C., and the calcination time can be set to, for example, about 1 hour to 20 hours.

4-4. Degreasing

Degreasing may be performed before the calcination described in section 4-3 above. Degreasing is performed by heating. Conditions such as degreasing temperature and degreasing time are set according to the materials of the cell and other factors. The degreasing temperature can be set to, for example, about 600° C. to 900° C., and the degreasing time can be set to, for example, about 1 hour to 20 hours.

4-5. Formation of Cathode

The cathode is formed by, for example, forming a layer of cathode materials according to compacting molding, printing, or a like process on a laminate of the anode, the electrolyte layer, and the barrier layer, and then performing calcination. Conditions such as calcination temperature and calcination time are set according to the materials of the cell and other factors. The calcination temperature can be set to, for example, about 900° C. to 1200° C., and the calcination time can be set to, for example, about 1 hour to 10 hours.

4-6. Other Steps

According to the configuration of the fuel cell, the production method may include an additional step, or the above-described steps may be modified. For example, the production method may include a step of providing a reaction preventive layer between the electrolyte layer and the cathode, or may include steps of forming an anode having a two-layer structure (a step of forming a substrate and a step of forming an anode active layer).

EXAMPLES

A. Preparation of Cell

An NiO-8YSZ anode active layer (10 μm), an 8YSZ electrolyte layer (3 μm), and a GDC barrier layer (3 μm) were stacked on an NiO-8YSZ anode (500 μm) and calcined together at 1400° C. for 2 hours.

As shown in Tables 1 to 3, a paste was prepared using electrode materials (powder) obtained by adding zirconia to $(La_{0.6}Sr_{0.4})(Co_{0.2}Fe_{0.8})O_3$, $(La_{0.8}Sr_{0.2})FeO_3$, or $La(Ni_{0.6}Fe_{0.4})O_3$, and the paste was processed into a film by screen printing to form a cathode (30 μm) on the barrier layer. The average particle diameter of the powder measured by a laser diffraction/scattering particle size distribution analyzer (LA-700, manufactured by Horiba Ltd.) was 0.5 μm. The cathode was baked onto the barrier layer by being heated at 1000° C. for 2 hours.

An SOFC cell was obtained through the above-described operation.

B. Evaluation

B-1. Power Output Density

Using the SOFC cell thus prepared, the output density at 0.8V under 750° C. was measured.

In the case where a cell had a cathode containing $(La_{0.6}Sr_{0.4})(Co_{0.2}Fe_{0.8})O_3$ as a principal component, the cell was evaluated as being good if the cell showed an output density no smaller than the reference value, 600 mW/cm². In Table 1, cells that showed a good output density are given "good" and otherwise the cells are given "poor". Likewise, in the case where a cell had a cathode containing $(La_{0.8}Sr_{0.2})FeO_3$ as a principal component, the cell was evaluated as being good if the cell showed an output density of 300 mW/cm² or greater, and in the case where a cell had a cathode containing $La(Ni_{0.6}Fe_{0.4})O_3$ as a principal component, the cell was evaluated as being good if the cell showed an output density of 400 mW/cm² or greater.

B-2. Thermal Cycling Test

The cells were subjected to a thermal cycling test using an infrared lamp. A thermal cycling test was performed in which one cycle consisted of heating to 750° C. in 10 minutes and cooling to normal temperature in 30 minutes was repeated 100 times, and the cells were visually inspected with a microscope to look for peeling at the interface between the cathode and the barrier layer.

Cells to which peeling had occurred were evaluated as being "poor" no matter if the power output density satisfied the reference value.

B-3. Observation of Microstructure of Cathode

The structure of the cathode before and after the thermal cycling test of section B-2 above was visually inspected with a scanning electron microscope (SEM).

C. Results

The evaluation results of the output density and the thermal cycling test are presented in Tables 1 to 3.

TABLE 1

Principal component: $(La_{0.6}Sr_{0.4})(Co_{0.2}Fe_{0.8})O_3$

| Sample No. | Amount of zirconia (wt. %) | Power density (mW/cm²) | Thermal cycling test (presence/absence of peeling after 100 cycles) | Evaluation |
| --- | --- | --- | --- | --- |
| 1 | 1.50 | 480 | No peeling | Poor |
| 2 | 1.00 | 660 | No peeling | Good |
| 3 | 0.650 | 630 | No peeling | Good |
| 4 | 0.300 | 680 | No peeling | Good |
| 5 | 0.100 | 650 | No peeling | Good |
| 6 | 0.025 | 645 | No peeling | Good |
| 7 | 0.010 | 635 | No peeling | Good |
| 8 | 0.007 | 655 | No peeling | Good |
| 9 | 0.003 | 660 | No peeling | Good |
| 10 | 0.001 | 650 | Peeled | Poor |

TABLE 2

Principal component: $(La_{0.8}Sr_{0.2})FeO_3$

| Sample No. | Amount of zirconia (wt. %) | Power density (mW/cm²) | Thermal cycling test (presence/absence of peeling after 100 cycles) | Evaluation |
| --- | --- | --- | --- | --- |
| 11 | 1.50 | 220 | No peeling | Poor |
| 12 | 1.00 | 350 | No peeling | Good |
| 13 | 0.650 | 360 | No peeling | Good |
| 14 | 0.300 | 345 | No peeling | Good |
| 15 | 0.100 | 350 | No peeling | Good |
| 16 | 0.025 | 350 | No peeling | Good |
| 17 | 0.010 | 330 | No peeling | Good |
| 18 | 0.007 | 345 | No peeling | Good |
| 19 | 0.003 | 360 | No peeling | Good |
| 20 | 0.001 | 370 | Peeled | Poor |

TABLE 3

Principal component: $La(Ni_{0.6}Fe_{0.4})O_3$

| Sample No. | Amount of zirconia (wt. %) | Power density (mW/cm²) | Thermal cycling test (presence/absence of peeling after 100 cycles) | Evaluation |
| --- | --- | --- | --- | --- |
| 21 | 1.50 | 285 | No peeling | Poor |
| 22 | 1.00 | 420 | No peeling | Good |
| 23 | 0.650 | 430 | No peeling | Good |
| 24 | 0.300 | 425 | No peeling | Good |
| 25 | 0.100 | 410 | No peeling | Good |
| 26 | 0.025 | 445 | No peeling | Good |
| 27 | 0.010 | 450 | No peeling | Good |
| 28 | 0.007 | 450 | No peeling | Good |
| 29 | 0.003 | 420 | No peeling | Good |
| 30 | 0.001 | 435 | Peeled | Poor |

As shown in Tables 1 to 3, irrespective of the composition of the principal component, peeling of the cathode was observed when the additive amount of zirconia was $0.1 \times 10^{-2}$ wt % or less while no peeling was observed when the additive amount of zirconia was $0.3 \times 10^{-2}$ wt % or greater.

Irrespective of the composition of the principal component, the resulting output density was low when the additive amount of zirconia was 1.50 wt % while high output densities were obtained when the additive amount of zirconia was 1.00 wt % or less.

The reason for the inhibition of cathode peeling achieved when the amount of zirconia was $0.3 \times 10^{-2}$ wt % or greater appears to be that due to the addition of zirconia in an appropriate amount, a solid solution of zirconia and ceria was formed at the interface between the cathode and the electrolyte layer, which was in contact with the cathode, and this solid solution contributed to enhancement of adhesion between the cathode and the electrolyte layer. Note that although the layer in contact with the cathode in this example was an electrolyte layer, the same effect is believed to be demonstrated no matter if the layer in contact is a different layer such as barrier film.

In contrast, the output density was lowered when zirconia was added excessively. Possible reasons therefor may be that the reaction between zirconia and a cathode component lanthanum (La) or strontium (Sr) generated lanthanum zirconate, strontium zirconate, or the like, resulting in:

Increased resistance value of the cell since the electric conductivity of those reaction products is low, Decreased reaction active spots, and/or Non-uniform composition of the cathode.

Figure 2:
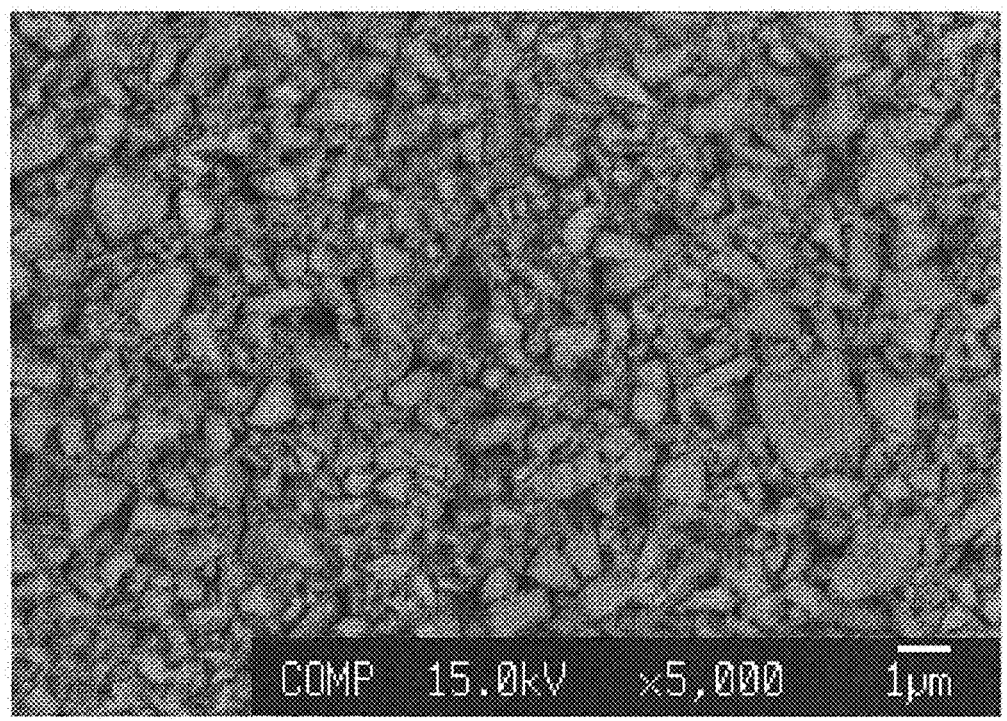
FIG. 2 is an SEM image showing the microstructure of a cathode before a thermal cycling test.
Figure 3:
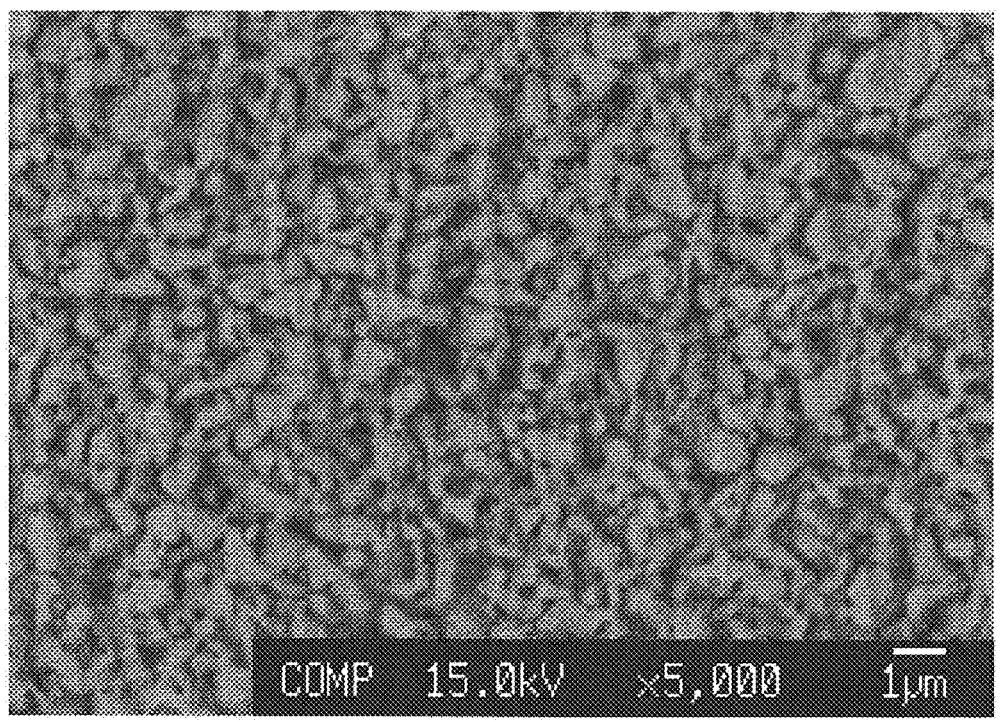
FIG. 3 is an SEM image showing a cathode containing 0.3 wt % of zirconia after a thermal cycling test.
Figure 4:
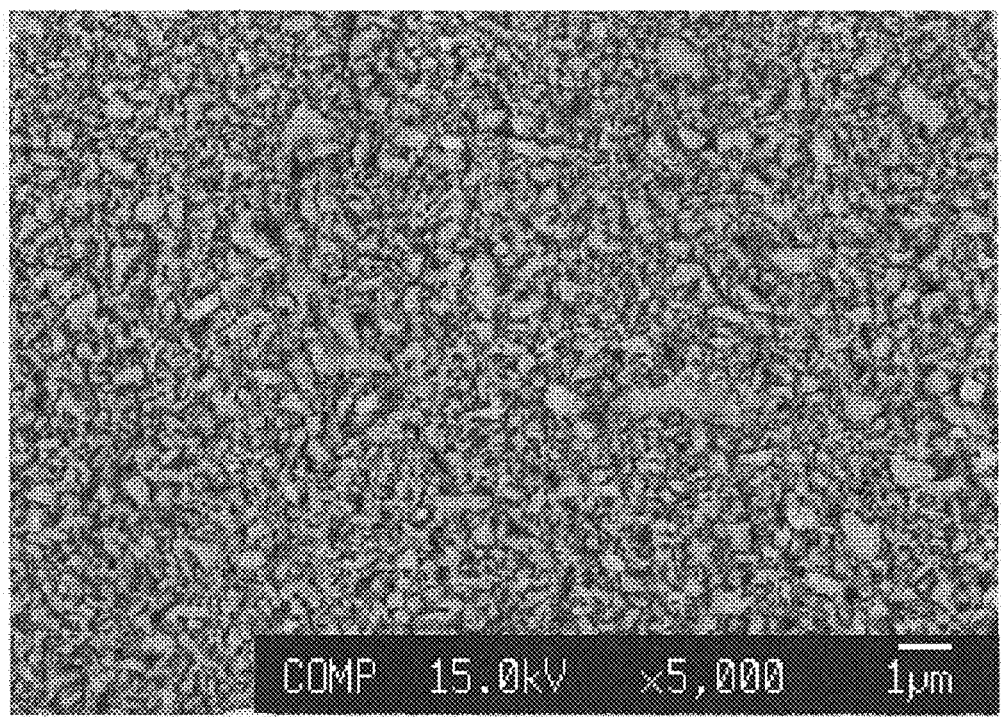
FIG. 4 is an SEM image showing a cathode containing 0.001 wt % of zirconia after a thermal cycling test.

Moreover, it appears that the addition of zirconia in a small amount brings about, in addition to the above-described effects, an effect to stabilize the microstructure of the cathode. All cathodes had a microstructure as shown in FIG. 2 before the thermal cycling test. However, after the thermal cycling test, this structure of the cathode of Sample No. 10 was collapsed as shown in FIG. 4. In contrast, as shown in FIG. 3, the structure of the cathode of Sample No. 4 was maintained even after the thermal cycling test. Such a structure-maintaining effect was observed in samples containing zirconia in an amount of 0.03 wt % or greater, and was prominently observed particularly in samples containing zirconia in an amount of 0.1 wt % or greater. Although not shown, the same results were obtained not only when the principal component of the cathode was $(La_{0.6}Sr_{0.4})(Co_{0.2}Fe_{0.8})O_3$ but also $(La_{0.8}Sr_{0.2})FeO_3$ and $La(Ni_{0.6}Fe_{0.4})O_3$.

These mechanisms of action of zirconia do not limit the present invention.

What is claimed is:

1. An electrode material comprising:
an oxygen ion conductive and electron conductive complex oxide having a perovskite structure represented by a formula $ABO_3$,
at least one of $ZrO_2$ and a compound comprising $ZrO_2$, and $ZrO_2$ being contained in an amount of $0.3 \times 10^{-2}$ wt % to 1 wt % relative to the entire electrode material.

2. The electrode material according to claim 1, wherein the A site includes at least one of La and Sr.

3. The electrode material according to claim 1, wherein the complex oxide is $(La_xSr_{1-x})(Co_yFe_{1-y})O_3$, $(La_xSr_{1-x})FeO_3$, $(La_xSr_{1-x})CoO_3$, $La(Ni_yFe_{1-y})O_3$, or $(Sm_xSr_{1-x})CoO_3$.

4. The electrode material according to claim 1, wherein the electrode material is a powder having an average particle diameter of 20 μm or less.

5. The electrode material according to claim 4, wherein the powder has an average particle diameter of 1.0 μm or less.

6. A solid oxide fuel cell comprising:
a cathode composed of the electrode material of claim 1;
an anode; and
a solid electrolyte layer disposed between the cathode and the anode.

* * * * *